US008650962B2

(12) United States Patent
Angus et al.

(10) Patent No.: US 8,650,962 B2
(45) Date of Patent: Feb. 18, 2014

(54) PRESSURE INDICATOR

(75) Inventors: Douglas J. Angus, Elgin (GB);
Alexander E. H. Fitzhugh, Bristol (GB)

(73) Assignee: Rolls-Royce PLC, London (GB)

( * ) Notice: Subject to any disclaimer, the term of this patent is extended or adjusted under 35 U.S.C. 154(b) by 343 days.

(21) Appl. No.: 13/225,768

(22) Filed: Sep. 6, 2011

(65) Prior Publication Data

US 2012/0090530 A1   Apr. 19, 2012

(30) Foreign Application Priority Data

Oct. 14, 2010 (GB) .................................. 1017355.7
Sep. 5, 2011 (GB) .................................. 1115279.0

(51) Int. Cl.
*G01L 7/00* (2006.01)
*G01L 7/24* (2006.01)

(52) U.S. Cl.
USPC ............................................. 73/700; 73/751

(58) Field of Classification Search
None
See application file for complete search history.

(56) References Cited

U.S. PATENT DOCUMENTS

| | | |
|---|---|---|
| 1,619,444 A | 3/1927 | Taylor |
| 2,486,133 A | 10/1949 | Egger |
| 2,804,093 A | 8/1957 | Scherer |
| 3,224,020 A | 12/1965 | Mori et al. |
| 3,505,627 A * | 4/1970 | Sipin ............................. 335/209 |
| 3,926,057 A * | 12/1975 | Baker ............................. 73/747 |
| 4,299,253 A | 11/1981 | Burton |
| 4,413,524 A | 11/1983 | Kosh |
| 4,517,844 A | 5/1985 | Powell |
| 4,668,889 A | 5/1987 | Adams |
| 5,343,754 A | 9/1994 | Stone |
| 5,509,312 A | 4/1996 | Donzier et al. |
| 2003/0131666 A1 | 7/2003 | Ewers et al. |
| 2005/0115326 A1 | 6/2005 | Dannhauer et al. |
| 2006/0156824 A1 | 7/2006 | Grudzien |
| 2007/0120568 A1 | 5/2007 | Bjorkman et al. |
| 2010/0018319 A1 | 1/2010 | Kurtz et al. |
| 2010/0024562 A1 | 2/2010 | Kurth et al. |
| 2010/0064815 A1 | 3/2010 | Vogler |
| 2010/0175482 A1 | 7/2010 | Kurtz et al. |
| 2011/0185818 A1 | 8/2011 | Kurtz et al. |
| 2012/0090397 A1 | 4/2012 | Angus et al. |

FOREIGN PATENT DOCUMENTS

| | | |
|---|---|---|
| EP | 0 334 235 A1 | 9/1989 |
| EP | 0 350 612 A2 | 1/1990 |
| EP | 1 555 518 A2 | 7/2005 |

(Continued)

OTHER PUBLICATIONS

British Search Report issued in British Application No. GB1115279.0 on Jan. 5, 2012.

(Continued)

*Primary Examiner* — Lisa Caputo
*Assistant Examiner* — Jermaine Jenkins
(74) *Attorney, Agent, or Firm* — Oliff PLC

(57) ABSTRACT

A pressure indicator for indicating pressure of a pressure source. The indicator comprises a first reservoir which defines a first enclosed volume having a first inlet pipe for communication between the first enclosed volume and a first source of pressurised fluid. The first inlet pipe defines a nominal communication path length between the first enclosed volume and a first source of pressurised fluid. A member is provided in the first inlet pipe which defines one or more communication paths of greater length to that of the nominal communication path length.

14 Claims, 8 Drawing Sheets

(56) References Cited

FOREIGN PATENT DOCUMENTS

| | | |
|---|---|---|
| GB | 570927 | 7/1945 |
| GB | 963607 | 7/1964 |
| GB | 2 456 865 A | 7/2009 |
| JP | A-61-167832 | 7/1986 |
| JP | A-10-54326 | 2/1998 |
| JP | A-2005-257551 | 9/2005 |
| SU | 621981 | 8/1978 |
| WO | WO 2006/076745 A1 | 7/2006 |
| WO | WO 2009/077433 A1 | 6/2009 |

OTHER PUBLICATIONS

Jan. 31, 2013 Office Action issued in U.S. Appl. No. 13/225,983.
Partial European Search Report issued in European Application No. 11 18 0144 on Nov. 21, 2011.
European Search Report issued in European Application No. 11 18 0143 on Nov. 21, 2011.
European Search Report issued in European Application No. 11 18 0140 on Nov. 21, 2011.
May 9, 2013 Notice of Allowance issued in U.S. Appl. No. 13/225,983.
Jun. 6, 2013 Office Action issued in U.S. Appl. No. 13/226,023.
Search Report issued in British Application No. GB1017959.6 dated Feb. 25, 2011.
Search Report issued in British Application No. GB1017351.6 dated Mar. 31, 2011.
Search Report issued in British Application No. GB1017355.7 dated Apr. 1, 2011.
U.S. Appl. No. 13/226,023, filed Sep. 6, 2011 in the name of Douglas J. Angus et al.
U.S. Appl. No. 13/225,983, filed Sep. 6, 2011 in the name of Douglas J. Angus et al.
British Search Report issued in British Patent Application No. 1113348.5 dated Nov. 23, 2011.

\* cited by examiner

PRESSURE INDICATOR

The present disclosure relates to a pressure indicator.

A conventional arrangement for indicating pressure is shown in FIG. 1. This shows a pressure indicator 10 which comprises a first reservoir 12 which defines a first enclosed volume 14 (or "pressure tapping") having a first inlet pipe 16 defining a nominal communication path length "L". The first inlet pipe 16 provides flow communication between the first enclosed volume 14 and a first source of pressurised fluid 20. A second reservoir 22 which defines second enclosed volume 24 (or "pressure tapping") having a second inlet pipe 26 that provides flow communication between the second enclosed volume 24 and a second source of pressurised fluid 30 may also be provided, as shown in FIG. 1. A pressure transducer 32 is disposed between the first enclosed volume 14 and the second enclosed volume 24, being in communication with both. The first and/or second source of pressurised fluid 20,30 may be flowing or static, where the pressure of the fluid rises and falls. The pressure transducer 32 reacts to the pressure changes in the enclosed volumes. In the case where only a single inlet pipe and enclosed volume are present, the pressure transducer may be used to indicate changes in pressure. Where a first and second inlet pipe and enclosed volume are present, as shown in FIG. 1, the pressure transducer may be used to indicate differences in pressure between the first and second source of pressurised fluid 20,30.

A problem with this design is that the system may exhibit Helmholtz resonance. The Helmholtz resonance may occur at a frequency which is given approximately by:

$$f = \frac{v}{2\pi} \sqrt{\frac{A}{V_0 L}}$$

Where v is the speed of sound in the fluid, A and L are the cross-sectional area and length of the inlet pipe respectively, and $V_0$ is the volume of the reservoir (i.e. the enclosed volume).

Helmholtz resonance occurs when a pressurised compressible fluid within an enclosed volume (or "cavity") equalizes pressure with respect to a reduced external pressure, i.e. the source of pressurised fluid 20,30. The fluid within the enclosed volume expands driving out the fluid in the inlet pipe. Due to the inertia of the fluid in the inlet pipe, the pressure in the enclosed volume drops below the external pressure causing fluid to be sucked back into the enclosed volume again to create a rise in pressure above that of the external pressure. This will repeat with a decay until the pressure in the enclosed volume equalises with the source of pressurised fluid.

In instances where the external pressure varies at a frequency which is matched to a resonant frequency of the enclosed volume, the resonance will draw energy from the pressure source, and the amplitude of the pressure fluctuations within the enclosed volume will grow until they greatly exceed the amplitude of the pressure fluctuations in the pressure source, and may be sufficient to damage the pressure transducer and/or the structure which defines the inlet pipes and enclosed volumes.

One way to avoid resonance is to choose dimensions of the enclosed volumes such that the resonant frequencies of the cavities do not coincide with the external pulsing frequencies present in the source of pressurised fluid. However, it may not be possible to achieve this over the entire operational range of the equipment which the pressure indicator is attached to. Alternatively, an error in design may mean that resonance occurs in an unexpected operational range, the only solution of which may be to redesign the enclosed volumes. This may not be possible within the available space, and even if it is, it will incur time and cost penalties.

Hence a pressure indicator for indicating pressure of a pressure source which is operational over a wide range of operating conditions and exhibits low amplitude Helmholtz resonance at a resonant frequency below the operational range of the pressure indicator is highly desirable.

SUMMARY

Accordingly there is provided a pressure indicator for indicating pressure of a pressure source, the indicator comprising a first reservoir which defines a first enclosed volume having a first inlet pipe for communication between the first enclosed volume and a first source of pressurised fluid and defining a nominal communication path length between the first enclosed volume and a first source of pressurised fluid wherein a member which defines a multitude of communication paths of greater length to that of the nominal communication path length is provided in the first inlet pipe.

The member provides a multitude of communication paths having a greater length than that of the nominal path length for pressure waves/oscillations to travel along. As a result the effective length of the first inlet pipe will be greater than the actual length of the first inlet pipe. In this context, "effective length" is defined as the theoretical length which defines the resonant frequency of the pipe. As a result the natural frequency of the pressure indicator system is reduced to a value outside of its operational range.

The effective diameter of the first inlet pipe with member may be less that the actual diameter of the first inlet pipe. In this context, "effective diameter" is defined to mean the theoretical inlet pipe diameter which defines the resonant frequency of the pipe. As a result the resonant frequency is reduced and viscous and frictional damping of pressure oscillation passing over and through the member will be increased and hence the likelihood of resonance is diminished.

The member may be provided with a number of surfaces which define a corresponding number of communication paths which are longer than the nominal communication path length.

The member may extend at least part of the length of the first inlet pipe.

The member may be spaced apart from the wall of the inlet pipe substantially along its whole length.

The member may be at least in part helicoid.

The member may be at least in part serpentine.

The member may be hollow and have a first orifice. The first orifice may be towards one end of the member. The first orifice may be provided between the ends of the member. The first orifice may be provided at one end with a second orifice provided at the opposite end of the member. The first orifice may be provided at one end with a second orifice provided between the ends of the member. The first orifice may be provided at one end, with a second orifice provided at the opposite end of the member and a third orifice provided between the ends of the member. At least one further orifice may be provided between the ends of the member.

The member may comprise a porous region which defines one or more communication paths of greater length to that of the nominal communication path length.

The pressure indicator of the present disclosure may also further comprise a pressure transducer in communication with the first enclosed volume.

The pressure indicator of the present disclosure may also further comprise a second reservoir which defines a second enclosed volume having a second inlet pipe for communication between the second enclosed volume and a second source of pressurised fluid, and the pressure transducer being in communication with the second enclosed volume.

BRIEF DESCRIPTION OF THE DRAWINGS

Examples of the present disclosure will now be described with reference to the accompanying drawings, in which.

DETAILED DESCRIPTION OF EXAMPLES

Figure 2:
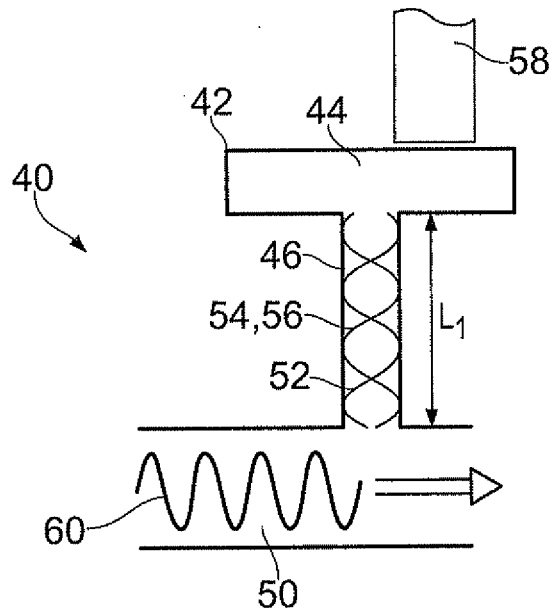
FIG. 2 shows a first example of a pressure indicator according to the present disclosure.

FIG. 2 shows a pressure indicator first example of the present disclosure. The pressure indicator 40 comprises a first reservoir 42 which defines a first enclosed volume 44 (or "pressure tapping") having a first inlet pipe 46 defining a nominal communication path length $L_1$. The first inlet pipe 46 provides flow communication between the first enclosed volume 44 and a first source of pressurised fluid 50. A member 52 is provided in the first inlet pipe 46. The member 52 defines one or more communication paths of greater length to that of the nominal communication path length $L_1$. In this example the member 52 is helicoid and extends at least part of the length of the first inlet pipe 46.

Figure 3:
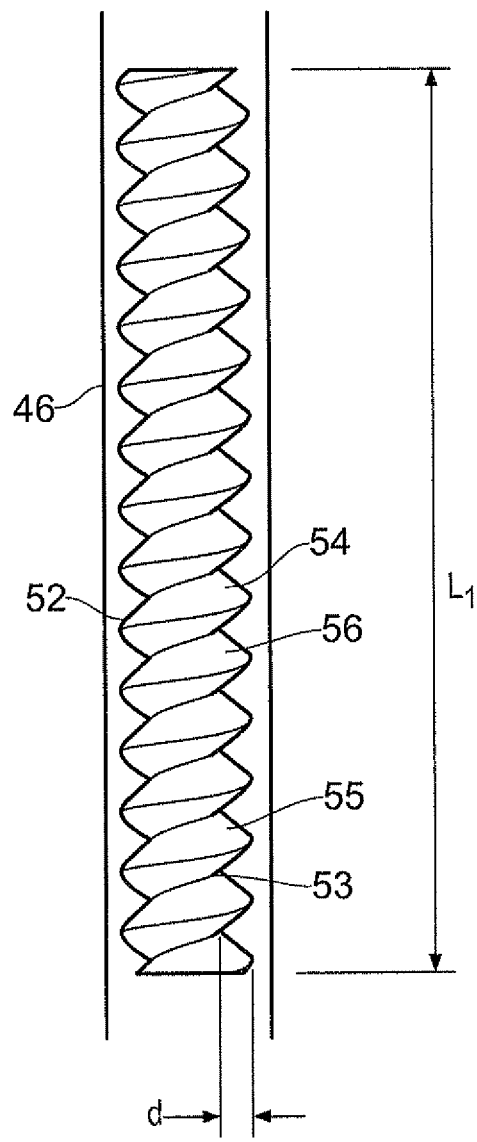
FIG. 3 shows a helicoid member which forms part of a number of examples of the present disclosure.

A more detailed example of a member 52 having a helicoidal form is shown in FIG. 3. The helicoid member 52 has a core 53 which supports a screw thread type formation 55 which defines the helicoid form. The screw thread formation 55 has a depth "d". The screw thread formation 55 extends the full length of the member 52. In FIG. 3 the screw thread formation 55 is shown with a depth "d" of approximately 30% of the external diameter of the member 52, and the core 53 is shown to be approximately 40% of the external diameter of the member 52. In an alternative example the depth of the screw thread formation "d" may be 45% or more of the external diameter of the member 52, with the core 53 being only a small percentage of the overall external diameter of the member 52. A large (i.e. deep) screw thread formation 55 is beneficial to provide a helicoid with a large surface area, thereby increasing the range of path lengths between the ends of the inlet pipe 46. The screw thread formation 55 is generally triangular in cross section.

The surface 54 of the member defines a plurality of communication path lengths 56, ranging between the nominal length $L_1$ ("short" or "fast" paths) and the helical communication path length provided by the surface of the helicoid at the outer diameter of the screw thread 55 ("long" or "slow" paths). The term "communication path" is intended to describe the multitude of routes or path lengths between the ends of the inlet pipe 46 which are created by the presence of the helicoid member 52 in the inlet pipe 46. These include any possible route over the surface of the helicoid, over the surface of the inlet pipe 46, in the space between inlet pipe 46 and the helicoid member 52, and in the space between the screw thread formations 55. That is to say the geometry of the helicoid member 52 will, when the pressure indicator is in use, generate a velocity distribution within the fluid passing along the fluid inlet pipe 46 and around the helicoid member 52 at any given cross section of the inlet pipe 46 and helicoid member 52. Hence a multitude of "short" (i.e. "fast"), "long" (i.e."slow") and intermediate path lengths are provided. Consequently the pressure indicator system has a great many communication path lengths longer than that of the nominal communication path length $L_1$ which increases the effective length and thereby reduces the natural frequency of the system.

Multiple communication path lengths (which consequently provide paths of different communication speeds) and increased surface area mean viscous dissipation and frictional losses will increase within the arrangement of the present disclosure providing increased damping of the system, and Helmholtz resonance will be less likely to occur.

The helicoid may have a textured and/or irregular surface comprising steps, ripples or pedestals to further increase its external surface area.

As shown in FIG. 3, the member 52 may be spaced apart from the wall of the inlet pipe 46 substantially along the whole length of the member 52. Consequently, the member 52 may be spaced apart from the wall of the inlet pipe 46 substantially along the whole length inlet pipe 46. In examples where the member 52 is spaced apart from the wall of the inlet pipe 46, the distance between the largest diameter of the member 52 and the wall of the inlet pipe is substantially constant along substantially the full length of the member 52.

Alternatively, the outer circumference of the member 52 is in contact with the wall of the inlet pipe 46 along substantially the full length of the member 52.

In both cases, where the member 52 is spaced apart from the wall of the inlet pipe 46 or in contact with the wall of the inlet pipe 46, it will be appreciated that a minimum clearance may be maintained. In the example where the member 52 is spaced apart from the wall of the inlet pipe 46, the clearance may be small. In the example where the member 52 is nominally in contact with the wall of the inlet pipe 46, a small clearance may be required to permit assembly.

In both cases, where the member 52 is spaced apart from wall of the inlet pipe 46, or in contact with the wall of the inlet pipe 46, the distance between the largest diameter of the helicoid member and the wall of the first inlet pipe is substantially constant along substantially the full length of the helicoid member. That is to say, even when the outer circumference of the member 52 is in contact with the wall of the inlet pipe 46 along substantially the full length of the member 52, the distance between the largest diameter of the helicoid member and the wall of the first inlet pipe 46 is substantially constant in that it is consistently substantially zero, although there may be a small clearance to enable assembly of the member 52 and fluid inlet pipe 46.

The member 52 may have a length no greater than that the length of the inlet pipe 46. The member 52 may not extend beyond the ends of the inlet pipe 46. The helicoid member 52 may have a length of at least three times the diameter of the inlet pipe 46. The helicoid member 52 may have a length of at least five times the diameter of the inlet pipe 46. The member 52 may be an insert placed in the inlet pipe (i.e. a separate component to the inlet pipe 46), or integral with the inlet pipe 46. The member 52 may be bonded in position in the inlet pipe 46 or free to move within the inlet pipe 46. There may be provided a location feature on the inlet pipe 46, for example a shoulder on the inner surface of the wall which defines the inlet pipe 46, which the member 52 sits against. A pressure transducer 58 may be placed in communication with the enclosed volume 44, either through an orifice in the wall of the reservoir 42 or by abutment with the wall of the reservoir 42. The pressure transducer will thus be able to register variations in pressure 60 in the first source of pressurised fluid 50.

Figure 4:
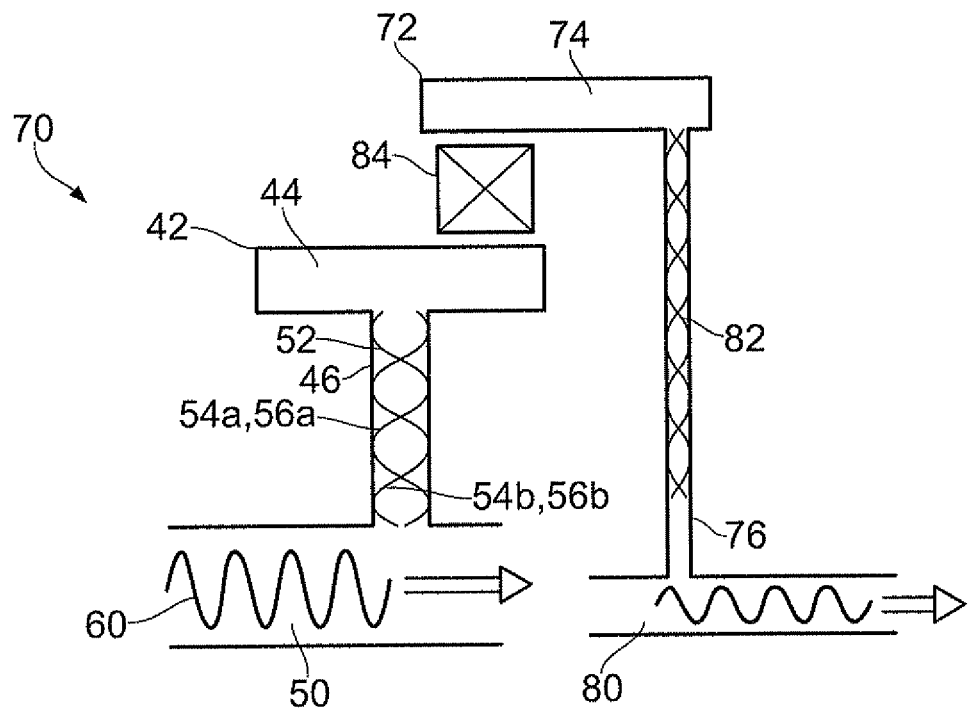
FIG. 4 shows a second example of a pressure indicator according to the present disclosure.
Figure 5:
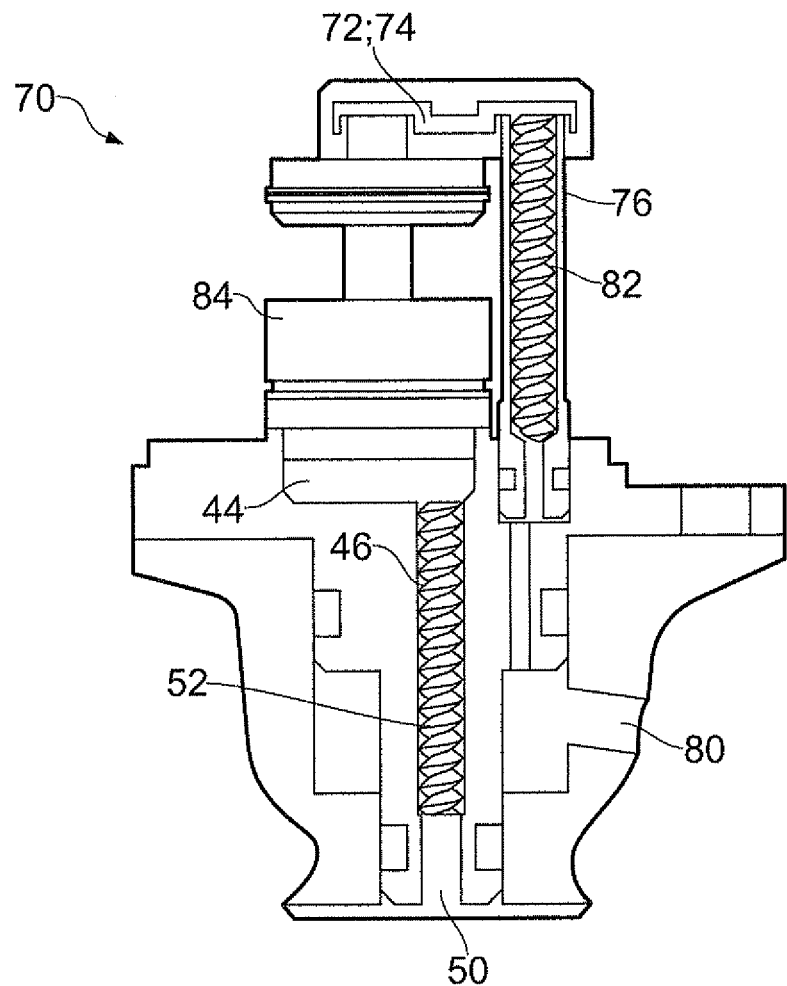
FIG. 5 shows a more detailed representation of the example of FIG. 4.

A second example of the present disclosure is shown in FIG. 4. A more detailed representation of the arrangement presented in FIG. 4 is shown in FIG. 5. Features in common with the example of FIG. 2 and FIG. 3 share the same integer numbers. In addition to all the features of the FIG. 2 and FIG. 3 examples, the pressure indicator 70 of FIG. 4 comprises a second reservoir 72 which defines a second enclosed volume 74 having a second inlet pipe 76 for communication between the second enclosed volume 74 and a second source of pressurised fluid 80. A member 82 is provided in the second inlet pipe 76, where the member 82 is similar to that of the member 52 in the first inlet pipe 46, having similar characteristics and provided to achieve the same result. A differential pressure transducer 84 is provided between and in communication with the first and second enclosed volumes 44,74, for the indication of pressure differences between the first source of pressurised fluid 50 and the second source of pressurised fluid 80. The member 82 provides the same effect as that described for the member 52 above.

Figure 6:
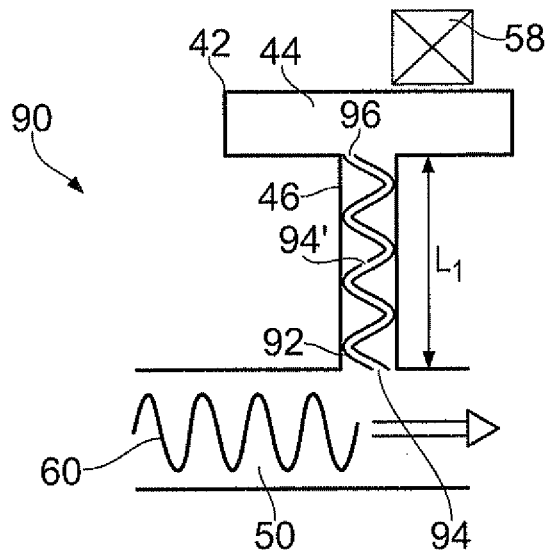
FIG. 6 shows a third example of a pressure indicator according to present disclosure.

An alternative pressure indicator 90 is shown in FIG. 6. The features of this example are similar to that shown in FIG. 2, except the member provided to generate the extra communication path lengths is a hollow member 92. The hollow member 92 has a first orifice 94. In one example, the first orifice 94 is towards one end of the member 92. In a further example, a first orifice 94' is provided between the ends of the member 92. In another example the first orifice 94 is provided at one end and a second orifice 96 is provided at the opposite end of the member 92. In another example the first orifice 94 is provided at one end and a second orifice 94' is provided between the ends of the member 92. In an alternative example the first orifice 94 is provided at one end, a second orifice 96 is provided at the opposite end of the member and a third orifice 94' is provided between the ends of the member 92. At least one further orifice is provided between the ends of the member 92.

The hollow member 92 has a longer communication path length than the nominal communication path length $L_1$, which thereby increases the effective length of the inlet pipe and reduces the natural frequency of the pressure indicator system. The diameter of the hollow member 92 is less than the diameter of the first inlet pipe 46 thereby decreasing the effective diameter of the system. The multiple communication path lengths and increased surface area provided by the hollow member 92 results in increased viscous dissipation and frictional losses which provides increased damping of the system, and Helmholtz resonance will be less likely to occur.

Figure 7:
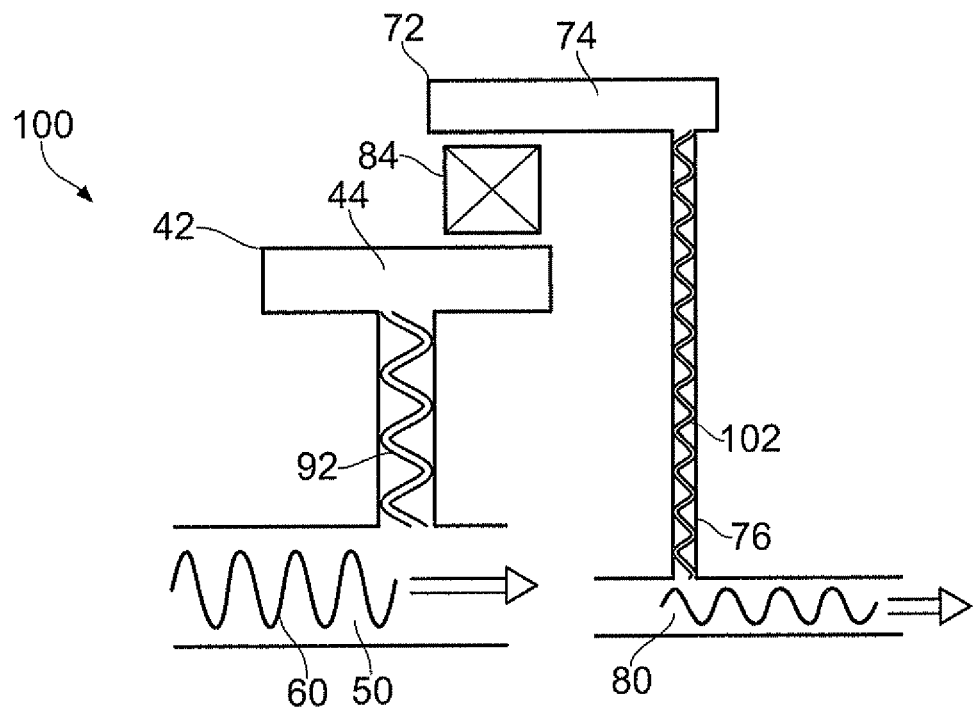
FIG. 7 shows a fourth example of a pressure indicator according to the present disclosure.
Figure 8:
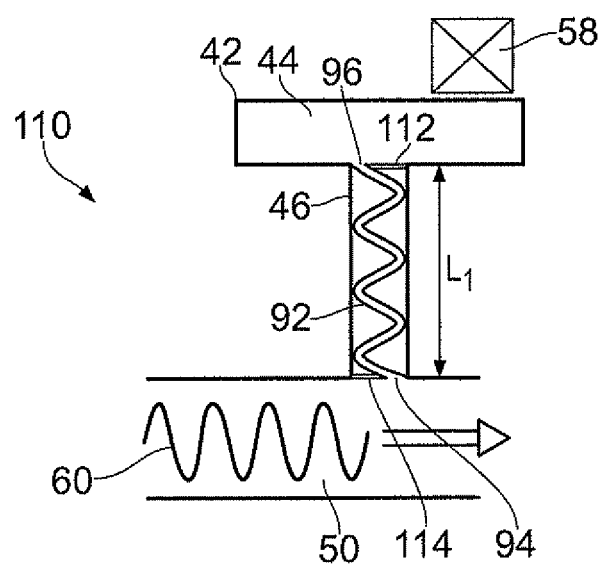
FIG. 8 shows a fifth example of a pressure indicator according to the present disclosure.

A further pressure indicator 100 is shown in FIG. 7. This is essentially the same as the example of FIG. 4, except that the members 52, 82 have been replaced by hollow members 92, 102 as described in relation to FIG. 6. A further pressure indicator 110 is shown in FIG. 8. This is essentially the same as the example of FIG. 6, except that walls 112,114 are provided at the ends of the first inlet pipe 46, with orifices 96,94 that correspond to orifices provided at the ends of the member 92. Hence the hollow member 92 is the only means of communication between the first enclosed volume 44 and the first source of pressurised fluid 50. Consequently the pressure indicator system has a longer communication path length than the nominal communication path length $L_1$ at a reduced diameter which thereby reduces the natural frequency of the system. The increased path length and reduced diameter provides an increased surface area relative to volume and results in increased viscous dissipation and frictional losses which provides increased damping of the system, and Helmholtz resonance will be less likely to occur.

Figure 9:
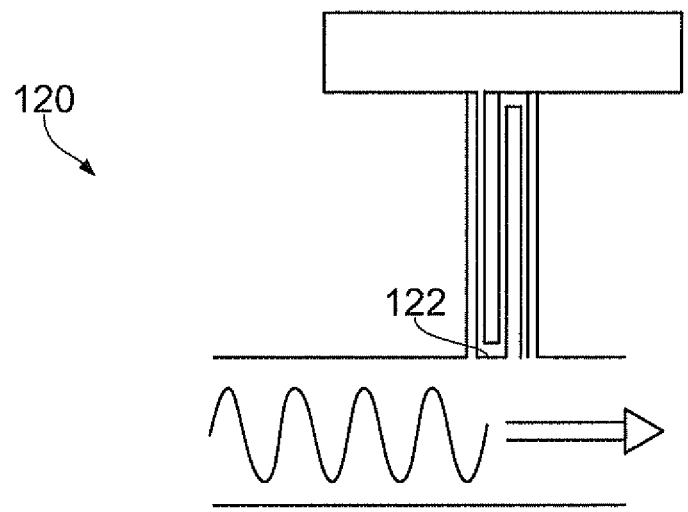
FIG. 9 shows a sixth example of a pressure indicator according to the present disclosure.

A further pressure indicator 120 is shown in FIG. 9. This is essentially the same as the arrangement of FIG. 6 except the member provided to generate the extra communication path lengths is a hollow member 122 with a serpentine form. That is to say, the member 122 is folded back on itself. The serpentine form creates different path lengths within the hollow member, thus creating a fluid velocity distribution in the member. Hence a multitude of "short" (i.e. "fast"), "long" (i.e."slow") and intermediate path lengths are provided. Consequently the pressure indicator system has a great many communication path lengths longer than that of the nominal communication path length $L_1$ which increases the effective length and thereby reduces the natural frequency of the system.

Figure 10:
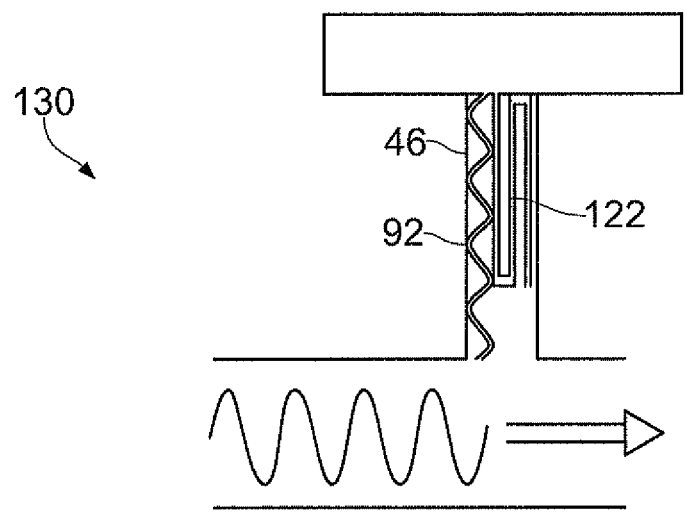
FIG. 10 shows a seventh example of a pressure indicator according to the present disclosure.

A further pressure indicator 130 is shown in FIG. 10, in which both a hollow helicoidal member 92 and a hollow serpentine member 122 are provided in the first inlet pipe 46. Additional hollow members may also be provided in the first inlet pipe 46.

Figure 11:
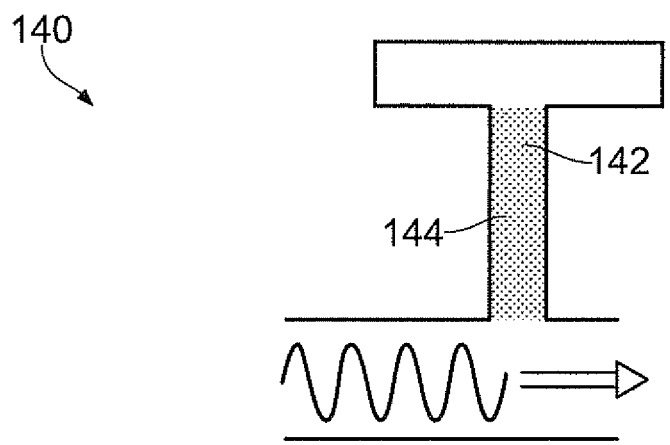
FIG. 11 shows a eighth example of a pressure indicator according to the present disclosure.
Figure 12:
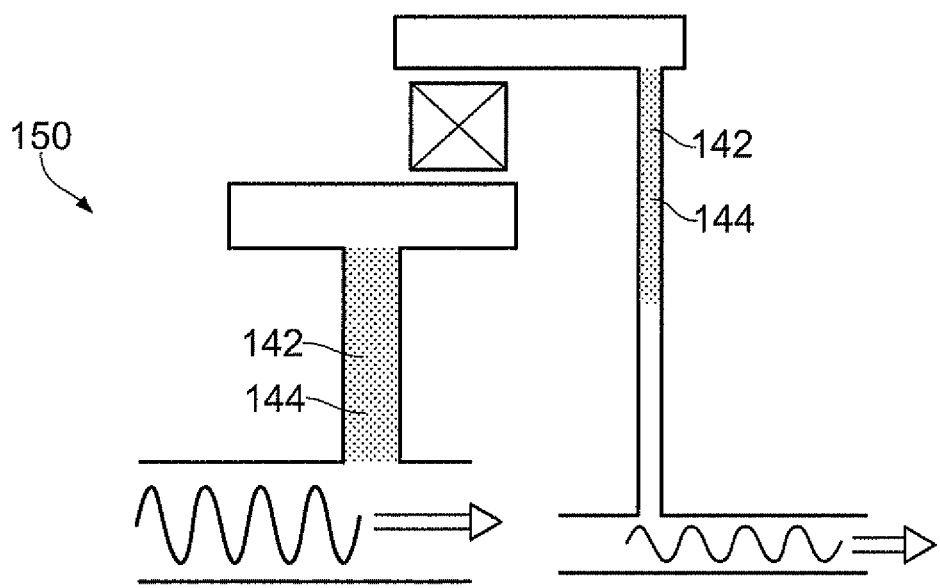
FIG. 12 shows a ninth example of a pressure indicator according to the present disclosure.

Further pressure indicators 140,150 are shown in FIG. 11 and FIG. 12, which are essentially the same as the arrangement of FIGS. 2, 4 and 5, and FIGS. 6 and 7 respectively, except the members provided to generate the extra communication path lengths comprise a porous region 142 which define one or more communication paths of greater length to that of the nominal communication path length $L_1$. That is to say, the members 144 of pressure indicators 140,150 are porous. The porous members 144 may comprise an open cell structure. The multiple communication path lengths and increased surface area result in increased viscous dissipation and frictional losses which provides increased damping of the pressure indicator system, and Helmholtz resonance will be less likely to occur.

In examples where the members 52,82, hollow members 92,102,122 and porous members 144 extend over only part of the length of their respective orifice tubes, one end of the member 52,82, hollow member 92,102,122 or porous member 144 may be provided adjacent their respective enclosed volume. This will provide more damping than if the members 52,82,92,102,122,144 are spaced apart from the enclosed volumes.

A pressure indicator according to the present disclosure, plus any equipment attached to it, will thus be less susceptible to damage due to Helmholtz resonance. This provides a means of modifying an existing pressure indicator system of pressure indicating equipment to increase survivability, and which are easier to configure for a wider range of applications.

Figure 1:
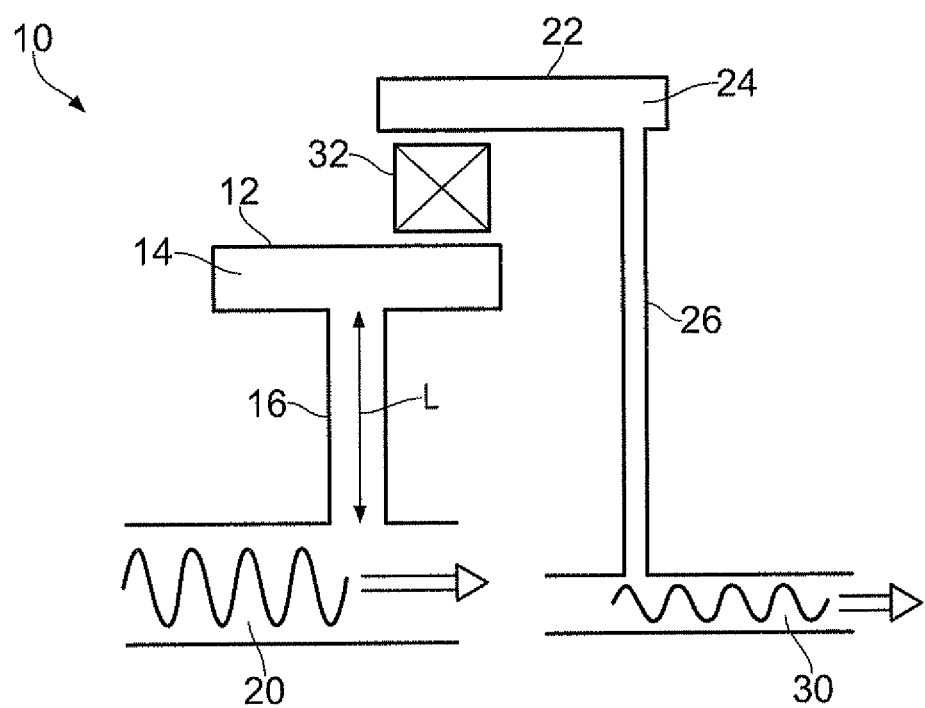
FIG. 1 shows a pressure indicator.

The device of the present disclosure may also be easily retrofitted to a system according to FIG. 1 by insertion of a member 52,82,92,102,122,144 into an existing system.

The first and/or second source of pressurised fluid 50,80 may be flowing or static, where the pressure of the fluid rises and falls.

The invention claimed is:

1. A pressure indicator for indicating pressure of a pressure source, the indicator comprising a first reservoir which defines a first enclosed volume having a first inlet pipe for communication between the first enclosed volume and a first source of pressurised fluid and defining a nominal communication path length between the first enclosed volume and a first source of pressurised fluid, wherein a member which defines a multitude of communication paths of greater length to that of the nominal communication path length is provided in the first inlet pipe, wherein the member is at least in part helicoid.

2. A pressure indicator as claimed in claim 1 wherein the member has a diameter less that the diameter of the first inlet pipe.

3. A pressure indicator as claimed in claim 1 wherein the member is provided with a number of surfaces which define a corresponding number of communication paths which are longer than the nominal communication path length.

4. A pressure indicator as claimed in claim 1 wherein the member extends at least part of the length of the first inlet pipe and the member does not extend beyond the ends of the first inlet pipe.

5. A pressure indicator as claimed in claim 1 wherein the member is spaced apart from the wall of the inlet pipe substantially along its whole length and the distance between the largest diameter of the helicoid member and the wall of the first inlet pipe is substantially constant along substantially the full length of the helicoid member.

6. A pressure indicator as claimed in claim 1 wherein the member is in contact with the wall of the inlet pipe along substantially the full length of the helicoid member.

7. A pressure indicator as claimed in claim 1 wherein the helicoid member has a length of at least three times the diameter of the first inlet pipe.

8. A pressure indicator as claimed in claim 1 wherein the helicoid member has a length of at least five times the diameter of the first inlet pipe.

9. A pressure indicator as claimed in claim 1 wherein the helicoid member comprises a core which supports a screw thread type formation having a depth of at least 30% external diameter of the helicoid member.

10. A pressure indicator as claimed in claim 9 wherein the screw thread formation is generally triangular in cross section.

11. A pressure indicator as claimed in claim 9 wherein the screw thread formation extends substantially the full length of the helicoid member.

12. A pressure indicator as claimed in claim 1 wherein the member is hollow and has a first orifice.

13. A pressure indicator as claimed in claim 1 further comprising a pressure transducer in communication with the first enclosed volume.

14. A pressure indicator as claimed in claim 13 comprising a second reservoir which defines a second enclosed volume having a second inlet pipe for communication between the second enclosed volume and a second source of pressurised fluid, and the pressure transducer being in communication with the second enclosed volume.

* * * * *